(12) United States Patent
Serra et al.

(10) Patent No.: US 6,188,952 B1
(45) Date of Patent: Feb. 13, 2001

(54) METHOD FOR DETERMINING THE PROGRESS OF INTERNAL PRESSURE OF A CYLINDER IN AN INTERNAL COMBUSTION ENGINE

(75) Inventors: Gabriele Serra, S. Lazzaro di Savena; Carlo Rossi; Giorgio Minelli, both of Bologna; Piero Azzoni, S. Lazzaro di Savena; Davide Moro, Bologna, all of (IT)

(73) Assignee: Magneti Marelli S.p.A., Milando (IT)

( * ) Notice: Under 35 U.S.C. 154(b), the term of this patent shall be extended for 0 days.

(21) Appl. No.: 09/253,557

(22) Filed: Feb. 19, 1999

(30) Foreign Application Priority Data

Feb. 20, 1998 (IT) .............................. BO98A0100

(51) Int. Cl.⁷ .......................... F02D 43/00; G01M 15/00
(52) U.S. Cl. .................. 701/103; 73/115; 123/406.24; 123/436
(58) Field of Search .................................. 701/102, 114, 701/103–105; 73/115, 116, 117.3, 49.7; 123/406.24, 406.25, 436

(56) References Cited

U.S. PATENT DOCUMENTS

| | | | |
|---|---|---|---|
| 4,843,870 | 7/1989 | Citron et al. | 73/116 |
| 5,200,899 | 4/1993 | Ribbens et al. | 701/111 |
| 5,394,330 | 2/1995 | Horner | 701/101 |
| 5,400,648 | * 3/1995 | Mahr | 73/115 |
| 5,631,411 | 5/1997 | Harms et al. | 73/117.3 |

FOREIGN PATENT DOCUMENTS

| | | |
|---|---|---|
| 0 501 531A1 | 9/1990 | (EP) . |
| 670 482A2 | 9/1995 | (EP) . |

OTHER PUBLICATIONS

Patent Abstracts of Japan, vol. 098, No. 001, Jan. 30, 1990, Abstract of JP 09 236514 Sep. 9, 1997 Copy of European Search Report dated Jul. 19, 1999 for EP 99 10 3321.

* cited by examiner

*Primary Examiner*—Andrew M. Dolinar
(74) *Attorney, Agent, or Firm*—Morgan & Finnegan LLP

(57) ABSTRACT

Method for determining the progress of internal pressure of a cylinder in an internal combustion engine, defining for each combustion cycle of the engine, the phases of defining the effective operating point of the engine according to the value assumed by a number of operational parameters of the engine; recording the progress of immediate angular speed of the engine shaft; calculating a transfer function involving the angular speed and the internal pressure of the cylinder at the effective defined operational point, on the basis of a plurality of reference transfer functions between internal pressure and angular speed relative to reference operating points of the engine; and deriving the progress of internal pressure at the cylinder of the transfer function at the actual operating point and of the progress of angular speed.

17 Claims, 3 Drawing Sheets

METHOD FOR DETERMINING THE PROGRESS OF INTERNAL PRESSURE OF A CYLINDER IN AN INTERNAL COMBUSTION ENGINE

BACKGROUND OF THE INVENTION

The present invention relates to a method for determining the progress of internal pressure in a cylinder of an internal combustion engine (1).

To determine the progress of the internal pressure in a cylinder of an internal combustion engine, during the different combustion cycles, it is known that a pressure sensor is located inside the combustion chamber relating to the cylinder. The pressure sensor effects a direct measurement of internal pressure in that it outputs an electrical signal representative of the internal pressure.

The pressure sensors of known type, although allowing a direct time evolution of the internal pressure to the cylinder to be obtained have the disadvantage of being extremely costly, and owing to the hostile conditions of the environment in which they operate, are subject to mechanical and thermal stresses of such a nature as to prejudice their suitable operation in the long term.

Consequently, such pressure sensors are not fitted to volume production engines due to the fact that in the first place they would enormously increase the costs, and in the second place they are likely to provide significant information for a relatively reduced period.

With a view to overcoming such inconveniences an indirect method has been introduced to determine the progress of internal pressure to the cylinder. The method is mainly based on the correlation between internal pressure to the cylinder and the engine block vibrations. In particular the method provides for the use of a piezoelectric accelerometer mounted on the engine block to correspond with the cylinder to generate an electric signal output representative of the engine block vibrations, and the use of a processing system allowing the extrapolation of the pattern of the internal signal from the pattern of the electrical output signal from the accelerometer.

The aforesaid method, notwithstanding the possibility of application to volume-production motor vehicle engines, still has the disadvantage that it requires an external sensor on the engine block (piezoelectric accelerometer). Installing such sensors on the engine block effectively involves additional cost due to the cost of the sensor itself, as well as the cost of modifications needed by the engine block to provide a seating allowing the sensor to be fitted.

SUMMARY OF THE INVENTION

The scope of the present invention is to provide a method for determining the progress of internal pressure to the cylinder of an internal combustion engine, which will be free from the aforementioned disadvantages, or will allow simple and economical determination of the progress of internal pressure without the need for modifications to the engine block and without the aid of external sensors on the actual engine block.

According to the present invention a method is provided to determine the progress of internal pressure to the cylinder of an internal combustion engine, the said method comprising the stages of recording the progress of the physical size of the said engine, and the determination of the progress of internal pressure to the cylinder in accordance with the said physical size; the method being characterised in that the progress of internal pressure of the said physical size is correlated with the pattern of immediate angular speed of the engine shaft.

BRIEF DESCRIPTION OF THE DRAWINGS

The present invention will now be described with reference to the appended drawings, which illustrate an example of non-restrictive implementation, wherein.

DETAILED DESCRIPTION OF THE INVENTION

Figure 1:
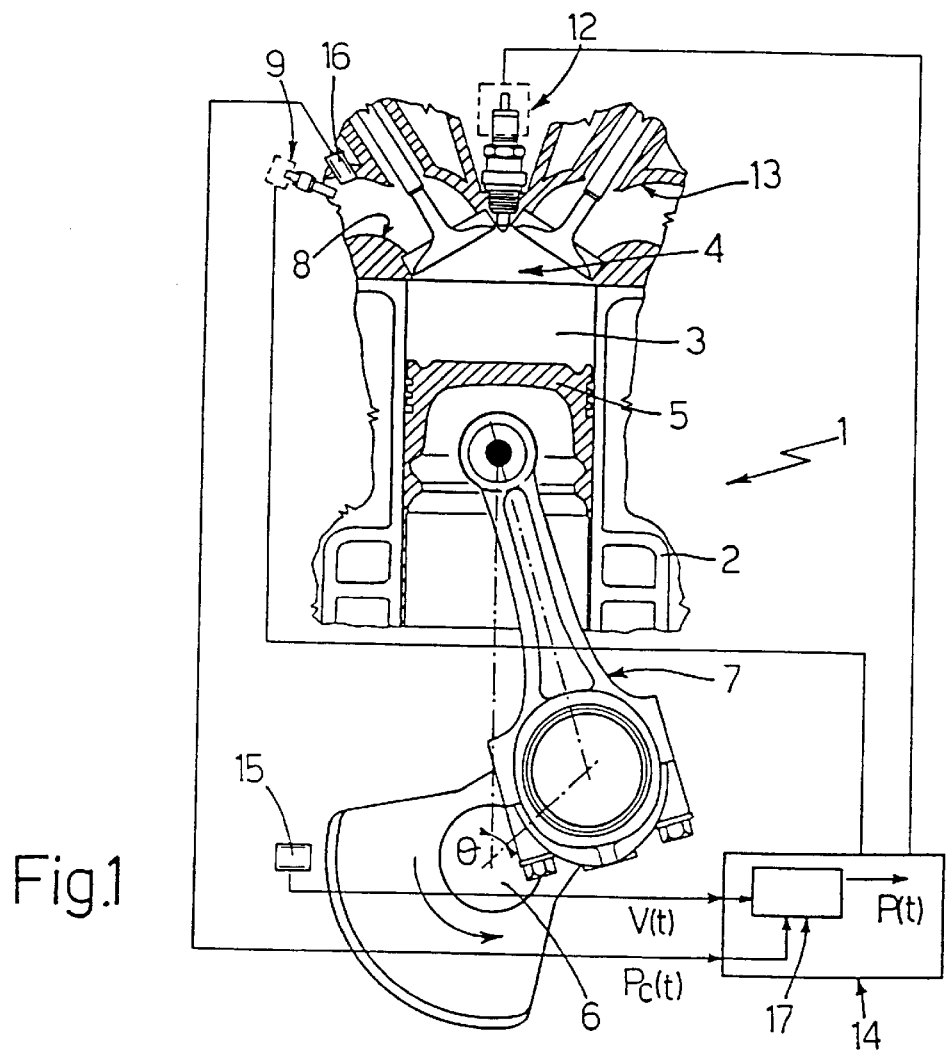
FIG. 1 illustrates as a diagram, an internal combustion engine, with items removed for clarity.

With regard to FIG. 1, a <<four-stroke>> engine of known type is indicated as a whole by reference 1, comprising a support base 2, and a plurality of cylinders 3 (of which only one is illustrated) carried by the base 2 and defining respective combustion chambers 4 to match the relevant upper ends. Inside each cylinder 3 a respective piston 5 is fitted, which is connected to the engine shaft 6 in a known manner by way of a respective con-rod 7, and axially movable inside the cylinder 3 itself between an upper position (known as top dead centre) and a lower position (known as the bottom dead centre).

The engine 1 comprises an intake manifold 8 connected to the cylinders 3 to supply a flow of combustible matter (air) in the cylinders 3, a fuel supply arrangement 9 in the cylinders 3, an ignition arrangement 12 to strike the combustion within the chambers 4, and an exhaust manifold 13 connected with the cylinders 3 to direct the burned gases in the outlet.

The engine is controlled by a central control 14 which cooperates with a plurality of internal sensors on the engine block to receive information signals at the inlet, representative of the physical dimensions of the engine 1, for example the position of the butterfly valve, the temperature of the cooling liquid and so on. In particular according to the illustration in FIG. 1, the centralised unit 14 is connected to a speed sensor 15 for the shaft 6 which generates on outlet a speed signal v(t) representative of the immediate angular speed of the shaft 6, and to a pressure sensor 16 placed along the intake manifold duct 8 to generate a pressure signal Pc(t) representative of the pressure in the manifold 8.

According to the present invention the central control 14 comprises a processing unit 17, which receives as input the immediate angular speed signal v(t) of the shaft 6, and is designed to generate for each cylinder 3 of the engine 1, a respective output signal P(t) representative of the progress of the internal pressure to the cylinder 3.

In particular the processing unit 17 is designed to define for each combustion cycle of the engine 1, the progress in time of the internal pressure of each cylinder 3 in relation to a time interval which comprises the moment when the associated piston 5 of the cylinder 3 is at top dead centre in the ignition phase. In other words, the unit 17 allows the definition of the progress of internal pressure towards the chamber 4 in a time interval comprising the ignition phase, as soon as the progress has been noted of the angular speed of the shaft 6 of the engine within the same time interval.

The operation of the processing unit 17, which implements the method object of the present invention, is now described with reference to a combustion cycle of the engine 1 and, for the purpose of simplicity, taking into consideration a single cylinder 3.

Figure 2:
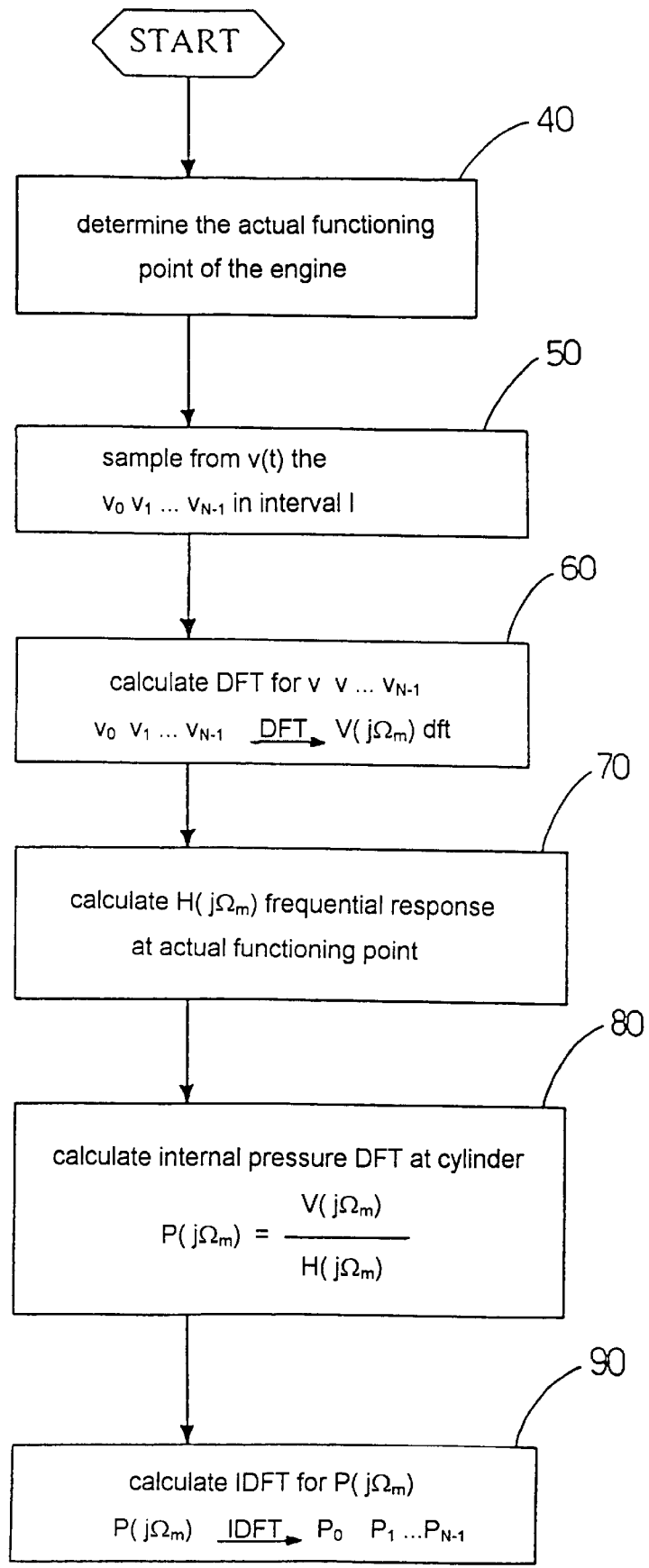
FIG. 2 illustrates as a block diagram operations implemented according to the method of the present invention.

Referring to FIG. 2, from an initial START block a block 40 is entered in which is determined the existing operating point of the engine 1 in accordance with an assembly of operational parameters for the engine 1.

In the example illustrated here the existing operating point is characterised by two operational parameters: the rate of engine rpm (revolutions per minute) and average pressure Pcm in intake manifold 8. In particular, the actual operating point is characterised on the basis of the values of the average Pcm pressure and rate of engine rpm relative to the combustion cycle before the existing cycle; the values of average Pcm pressure and rate of engine rpm relative to the preceding combustion cycle to the existing cycle are available in that they have been calculated by way of the Pc(t) signals, and respectively the v(t) signal for the preceding combustion cycle.

It is evident that it is possible to characterise the point of existing operation in accordance with a diverse number of operational parameters, or simply as a function of a differing pair of parameters, such as for instance the rpm rate and the average torque transmitted to the shaft 6.

As output from the block 40 a block 50 is entered wherein are sampled a specific number N of values of the v(t) signal of immediate angular speed of the shaft 6; hereinafter indicated as $v_0, v_1, \ldots, V_{N-1}$, the said sampled values, relate to a time interval comprising the moment at which the piston 5 is located in the top dead centre at the ignition stage. In the example illustrated here the interval I represents the time interval in which the angular position θ of the shaft 6 (FIG. 1) is comprised within an angular interval $I_\theta$ (FIG. 4) of an extent equal to 180° and centred in the angular position in which the piston 5 comes into the bottom dead centre point during the ignition stage.

Block 50 goes on to block 60 in which is calculated in a known manner the discrete Fourier transformation V(jΩm) of the angular speed v(t) signal in a "window" (or so considered) in interval I, according to the expression:

$$V(j\Omega m) = \sum_{n=0} Vn \cdot e^{-j(\Omega m \cdot n)} \quad (1)$$

wherein Ωm is the angular frequency defined as $$\Omega m = \frac{2 \cdot \pi \cdot m}{N} \quad (2)$$

wherein N is the aforesaid number of sampled values of signal v(t) retained in the window of interval I and m is the number of the m-ordinal harmonic present in the actual v(t) signal.

Block 60 goes on to block 70 in which is calculated as will be seen later, a frequential response function H(jΩm) relating to the actual operating point of the engine 1 and expressing the link between the progress of the angular speed v(t) signal and the internal pressure signal p(t) of the cylinder 3 within the scope of angular frequencies. As will be explained further on, each engine operation point is associated with a specific frequential response function H(jΩm).

Block 70 goes on to block 80 in which, from the knowledge of the discrete Fourier transformation V(jΩm) and of the frequential response function H(jΩm), is calculated the discrete Fourier transformation P(jΩm) of the signal P(t) representative of the internal pressure to cylinder 3 according to the expression:

$$P(j\Omega m) = \frac{V(j\Omega m)}{H(j\Omega m)} \quad (3)$$

Block 80 goes on to block 90 in which the anti-transformation operation according to Fourier of the P(jΩt) transformation is carried out to obtain the evolution of the P(t) signal internal pressure to cylinder 3 in the I time interval. In particular the anti-transformation operation is carried out according to the known expression of $$p_n = \frac{1}{N} \sum_{m=0} P(j\Omega m) \cdot e^{j(\Omega m \cdot n)} \text{ for } n = 0 \ldots N-1 \quad (4)$$

wherein $P_0, P_1, \ldots, P_{N-1}$, indicate the reconstructed values for internal pressure in the cylinder 3 at the moments when the $v_0, v_1, \ldots, v_{N-1}$ values are sampled within the I time interval.

In this way by means of the P(t) signal and in particular through the $P_0, P_1, \ldots, P_{N-1}$ values, the processing unit 17 provides on output the progress of the internal pressure P(t) to cylinder 3 relatively to the I time interval, or during the combustion.

According to the above description, the relationship of (3) is thus the key to the reconstruction of the internal pressure signal P(t) from the angular speed output signal v(t) from the sensor 15. The relationship (3) is based on the existence of an experimentally proved linear correlation, between the progress of the immediate internal pressure to a cylinder 3 in the interval I, or in a corresponding angular position interval IQ assumed by the engine shaft 6 centred about the position in which the piston 5 is at top dead centre. It has been found experimentally that to reconstruct with reasonable approximation the signal P(t), it is possible to take into consideration only a certain number of harmonics, for instance the first seven harmonics; this provides the expression (4) which allows the progress of internal pressure to become $$pn = \frac{1}{7} \sum_{m=0} P(j\Omega m) \cdot e^{j(\Omega m \cdot n)} \text{ for } n = 0 \ldots N-1$$

Calculation of the function (H(jΩm)) effected in block 70, is made on the basis of the knowledge of a plurality of reference frequential response ($H_R$(jΩm), each of which relates to a specific reference operating point R of the engine 1, and is stored within the processing unit 17.

In particular, representing reference points R on the (rpm, Pcm) plane of the possible operating points of the engine (FIG. 3), the (H(jΩm)) function relating to the actual operating point (indicated as K on the (rpm,Pcm) plane is calculated while taking into consideration a sub-assembly S of points R. That sub-assembly S comprises reference points R closest to the actual operating point K.

The (H(jΩm)) function relating to point K is calculated while effecting an average assessment of ($H_R$(jΩm) functions forming part of sub-assembly S according to the expression $$H(j\Omega m) = \sum_{R \in S} H_R(j\Omega m) * D_R \quad (5)$$

wherein $D_R$ is the weight associated with point R, and is a function of the distance between point R and point K on the (rpm,Pcm) plane.

Figure 3:
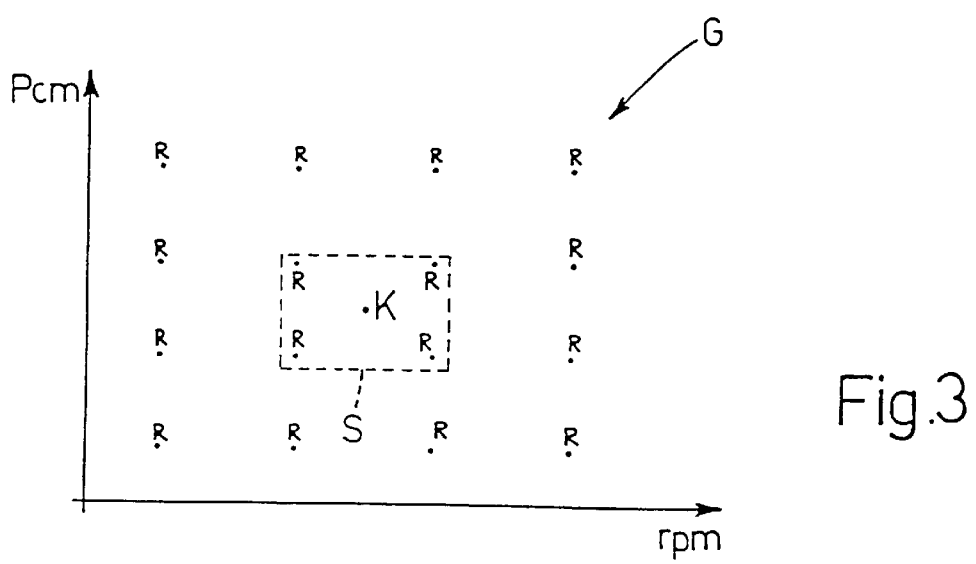
FIG. 3 illustrates a Cartesian diagram representative of the points of operation of the engine in FIG. 1.

In particular, in the example illustrated in FIG. 3, reference points R are arranged in such a manner as to form a grid G, and sub-assembly S comprises the four points R surrounding the actual operating point K.

Effecting a synthesis, calculation of the H(jΩm) function relating to the actual operating point of the engine is thus carried out (FIG. 3) in the following manner:

- the actual operating point (K) (block 40) is singled out on the (rpm,Pcm) plane;
- the sub-assembly is determined characterising the reference points R closest to point K;
- the weights $D_R$ are calculated as a function of the Euclidean distances between the said points R and point K on the (rpm-Pcm) plane;
- the function H(jΩm) is calculated on the basis of the reference functions $H_R$(jΩm) associated with the R points of the S sub-assembly according to the expression (5).

It thus results from the above that the knowledge of frequential response functions $H_R$(jΩm) at points R of the grid G allows a return to the progress of the internal pressure to the cylinder 3 during interval I, once the progress of angular speed of the shaft 6 is known.

Reference functions $H_R$(jΩm) of reference points R, stored in the processing unit 17, each expresses the link between the V(jΩm) Fourier transformation of angular speed signals v(t) of engine shaft 6 and the Fourier transformation P(jΩm) of the internal pressure signals P(t) to cylinder 3 when the engine 1 is at the operating point R, that is to say $$H_R(j\Omega m) = \frac{V(j\Omega m)}{P(j\Omega m)}$$

Such $H_R$(jΩm) frequential response functions are acquired following reference to a sample engine having the same geometrical and structural characteristics as engine 1 (for instance con-rod length, crankshaft length, piston surface area, etc.). In effect such a sample engine is fitted with a pressure sensor internally mounted in the combustion chamber of the cylinder to generate directly on output the P(t) internal pressure signals to the cylinder. Once the operational parameters of the sample engine have been established to ensure that the relative operating point coincides with the reference operating point R, the progress data for immediate angular speed (v(t)) and internal pressure (P(t)) are determined in accordance with the observation time interval I. At that stage the Fourier transformations V(jΩm) and P (jΩm) for angular speed v(t) and internal pressure P(t) are calculated, and subsequently the $H_R$(jΩm) functions relating to point R of the following ratio are determined $$H_R(j\Omega m) = \frac{V(j\Omega m)}{P(j\Omega m)}$$

All the frequential response functions $H_R$(jΩm) are defined with reference to the sample motor. Such $H_R$(jΩm) functions are stored in the processing unit 17 of the engine 1 to allow return to the time progress of the internal pressure to cylinder 3 without having to install a pressure sensor inside the combustion chamber 4.

From the above description it follows that in the engine 1, intended to serve as an engine for volume vehicle production, it is possible to define the progress of internal pressure to the cylinder, cycle after cycle, by means of measurement of the angular speed of the engine shaft, and without the aid of a sensor system or the engine block, as for instance a pressure sensor directly mounted inside the combustion chamber, or a piezoelectric accelerometer.

Figure 4:
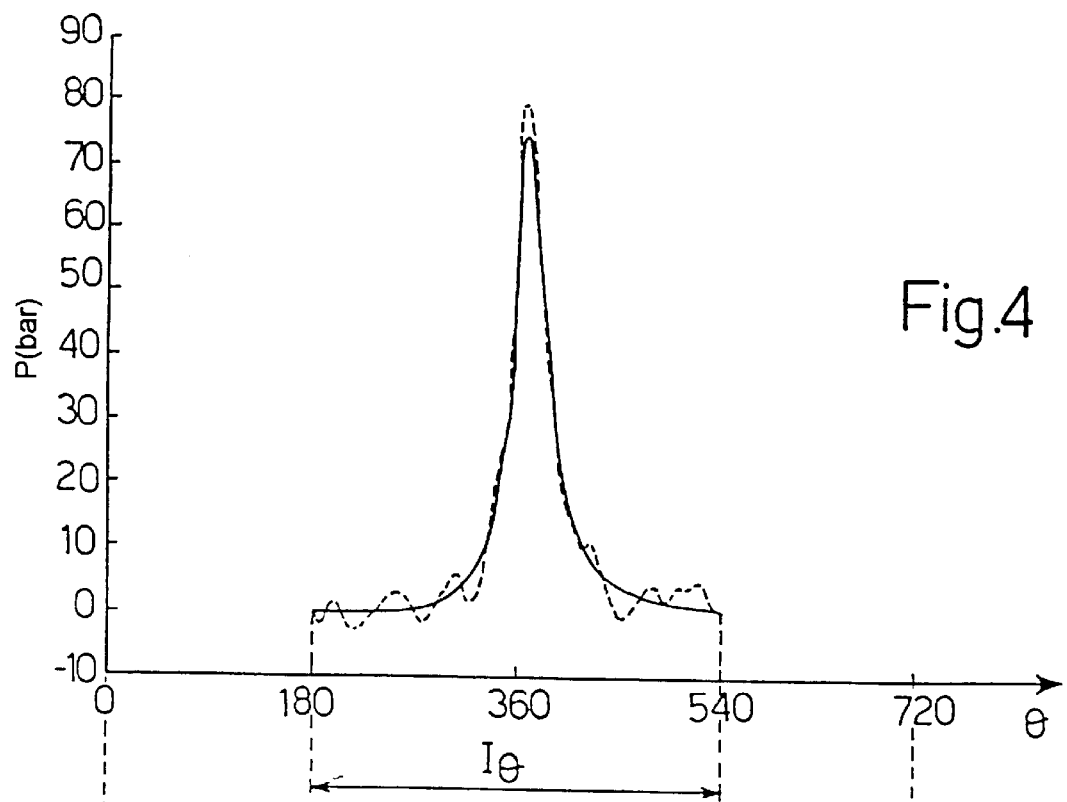
FIG. 4 illustrates the progress of the internal pressure for a cylinder of the engine in accordance with the angular position of the engine shaft during a combustion cycle.

As illustrated in FIG. 4, with reference to direct measuring methods for internal pressure at the cylinder, the method according to this invention allows the reconstruction of the progress of the internal pressure at the cylinder with an optimum level of approximation. In effect, graphically representing the progress of internal pressure at the cylinder 3 according to the angular position of the engine shaft in the angular interval Iθ of the engine shaft, the following may be observed:

the progress of internal pressure, reconstructed from the processing unit 17 and illustrated as a continuous line in FIG. 4, does not differ significantly from the progress of internal pressure measured directly with a pressure sensor fitted inside the cylinder (progress illustrated in broken lines). This shows that the processing unit 17 is able to provide a time evolution of the internal pressure to the cylinder 3 very close to that achieved by direct measurement.

Figure 5:
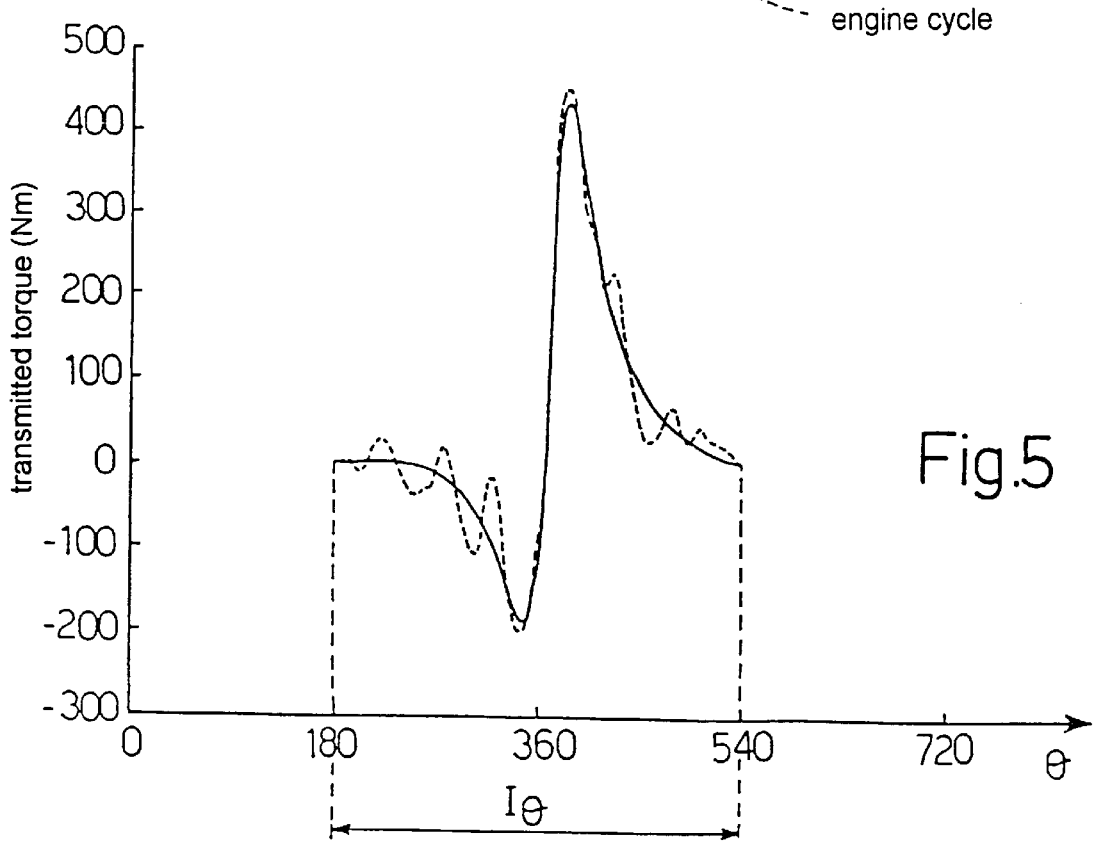
FIG. 5 illustrates the progress of the torque transmitted to the engine shaft as a function of the angular position of the engine shaft during a combustion cycle.

Finally it would be useful to emphasize that from the progress of the internal pressure at the cylinder 3 it is possible to go back directly to the progress of the torque transmitted to the engine by applying the mathematical conditions linking internal pressure to the cylinder with the torque as transmitted. FIG. 5 shows as a continuous line the reconstruction of the progress of the torque transmitted to the shaft 6 in the aforesaid angular interval Iθ; it can be seen how once again the progress does not differ significantly from the progress which would be obtained by direct measurement of the transmitted torque (see the broken line).

With the method as described it is thus possible to determine the internal pressure to the cylinder 3 without the need for excessive costs arising out of the fitting of external sensors to the engine block. This guarantees the possibility of applying the method to volume production engines in a simple and economical manner.

What is claimed is:

1. Method for controlling an internal combustion engine having a shaft, an intake manifold, a fuel supply device, an ignition device and at least one cylinder, the method comprising:

defining an plurality of operating points of the engine based on an average angular speed of the engine shaft and an average pressure at the intake manifold of the engine;

recording an instantaneous angular speed of the shaft;

defining, in relation to each operating point of the engine, a transfer function relating the instantaneous angular speed of the shaft to an internal pressure to the cylinder;

determining the internal pressure to the cylinder based on the instantaneous angular speed of the shaft and at least one of the transfer functions; and controlling the fuel supply device and the ignition device based on the internal pressure to the cylinder.

2. Method according to claim 1, wherein the transfer function is a frequential response involving the internal pressure and the instantaneous angular speed of the shaft.

3. Method according to claim 1, wherein the recording of the instantaneous angular speed of the shaft comprises sampling, for each combustion cycle of the engine, the instantaneous angular speed in accordance with a plurality of sampling moments thereby obtaining a plurality of measured values.

4. Method according to claim 3, wherein the determining the internal pressure to the cylinder comprises:

calculating the Fourier discrete transformation of instantaneous angular speed according to the plurality of measured values;

applying the transfer function to the Fourier transformation of angular speed to obtain the Fourier transformation of internal pressure to the cylinder;

calculating the Fourier anti-transformation of the Fourier internal pressure to obtain the Fourier transformation of internal pressure to obtain a plurality of values estimated from the internal pressure at the sampling moments of the instantaneous angular speed; the plurality of values estimated from the internal pressure defining the internal pressure to the cylinder.

5. Method according to claim 3, wherein the sampling of the instantaneous angular speed is effected, at each combustion cycle of the engine, in a time interval wherein a piston associated with the cylinder moves in a preset manner to a top dead center position during the engine ignition phase.

6. Method according to claim 1, wherein the transfer function between the internal pressure and the instantaneous angular speed of the engine shaft at the operating point of the engine is calculated by processing the transfer function corresponding to an actual operating point of the engine.

7. Method according to claim 1, further comprising for each cycle of the engine, deducing a torque transmitted to the engine shaft based on the internal pressure to the cylinder.

8. Method for controlling an internal combustion engine having a shaft, an intake manifold, a fuel supply device, an ignition device and at least one cylinder, the method comprising:

defining an plurality of operating points of the engine, wherein an average angular speed of the engine shaft and an average internal pressure at the intake manifold define a plane of possible operating points of the engine; each of the operating points of the engine being represented by a respective point of the plane; the reference operating points of the engine defining a grid on the plane;

recording an instantaneous angular speed of the shaft;

defining, in relation to each operating point of the engine, a transfer function relating the instantaneous angular speed of the shaft to an internal pressure to the cylinder;

determining the internal pressure to the cylinder based on the instantaneous angular speed of the shaft and at least one of the transfer functions; and controlling the fuel supply device and the ignition device based on the internal pressure to the cylinder.

9. Method according to claim 8, wherein on the grid a sub-assembly of the reference operating points comprising the reference points closest to an actual operating point is defined on the plane; the transfer function at the actual operating point being calculated as an average set of reference transfer functions relating to the reference operating points of the sub-assembly, each reference transfer function intervening in the average set according to a weight which is a function of the Euclidean distance between the relative reference operating point and the actual operating point.

10. Method according to claim 8, wherein the transfer function is a frequential response involving the internal pressure and the instantaneous angular speed of the shaft.

11. Method according to claim 8, wherein the recording of the instantaneous angular speed of the shaft comprises sampling, for each combustion cycle of the engine, the instantaneous angular speed in accordance with a plurality of sampling moments thereby obtaining a plurality of measured values.

12. Method according to claim 11, wherein the determining the internal pressure to the cylinder comprises:

calculating the Fourier discrete transformation of instantaneous angular speed according to the plurality of measured values;

applying the transfer function to the Fourier transformation of angular to obtain the Fourier transformation of internal pressure to the cylinder;

calculating the Fourier anti-transformation of the Fourier internal pressure to obtain the Fourier transformation of internal pressure to obtain a plurality of values estimated from the internal pressure at the sampling moments of the instantaneous angular speed; the plurality of values estimated from the internal pressure defining the internal pressure to the cylinder.

13. Method according to claim 11, wherein the sampling of the instantaneous angular speed is effected, at each combustion cycle of the engine, in a time interval wherein a piston associated with the cylinder moves in a preset manner to a top dead center position during the engine ignition phase.

14. Method according to claim 8, wherein the transfer function between the internal pressure and the instantaneous angular speed of the engine shaft at the operating point of the engine is calculated by processing the transfer function corresponding to an actual operating point of the engine.

15. Method according to claim 8, further comprising for each cycle of the engine, deducing a torque transmitted to the engine shaft based on the internal pressure to the cylinder.

16. A control unit for an internal combustion engine having a shaft, an intake manifold, a fuel supply device, an ignition device and a plurality of cylinders, the control unit comprising:

a sensor to be attached to the engine; and a processing unit in cooperation with the sensor, the processing unit configured:

to receive from the sensor a signal reflecting an angular speed of the shaft;

to store a plurality of predefined transfer functions relating to operating points of the engine, each said operating point based on an average angular speed of the engine shaft and an average pressure at the intake manifold;

to determine, for each cylinder, an internal pressure to the cylinder based in part on the angular speed signal and at least one of the predefined transfer functions; and to control the fuel supply device and the ignition device based on the internal pressure to the cylinder.

17. A control unit for an engine having a shaft, an intake manifold, a fuel supply device, an ignition device and a plurality of cylinders, the control unit comprising:

a sensor to be attached to the engine;

means for receiving from the sensor an angular speed of the shaft signal;

means for storing a plurality of predefined transfer functions relating to operating points of the engine, each said operating point based on an average angular speed of the engine shaft and an average pressure at the intake manifold;

means for determining, for each cylinder, an internal pressure to the cylinder based in part on the angular speed and at least one of the predefined transfer functions; and means for controlling the fuel supply device and the ignition device based on the internal pressure to the cylinder.

* * * * *